C. BEVILL.
CULTIVATOR.
APPLICATION FILED MAY 17, 1919.
1,381,393.
Patented June 14, 1921.
2 SHEETS—SHEET 1.
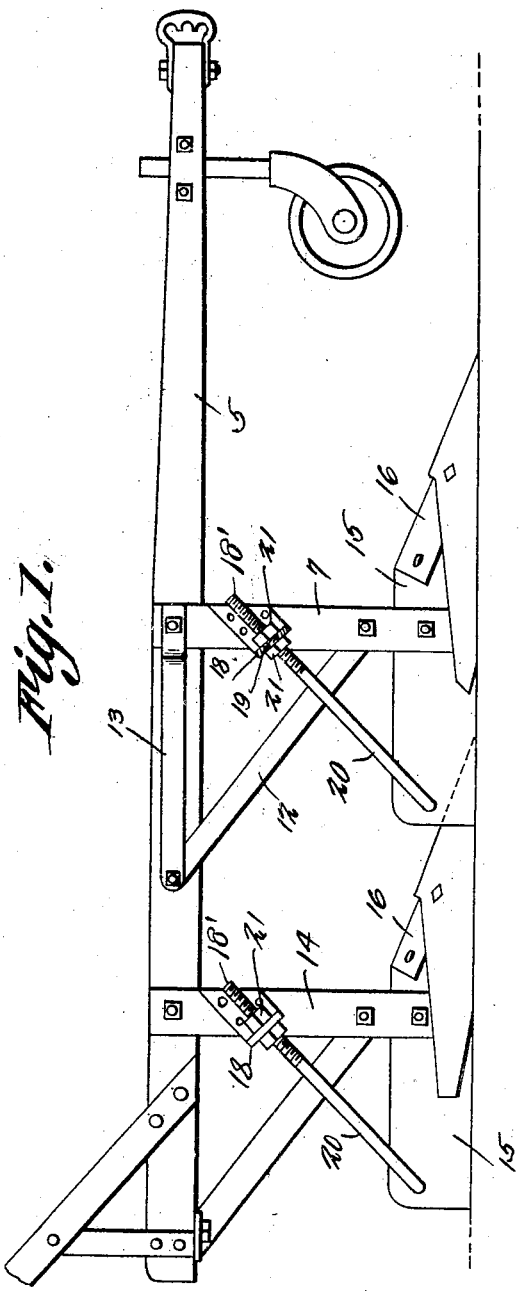
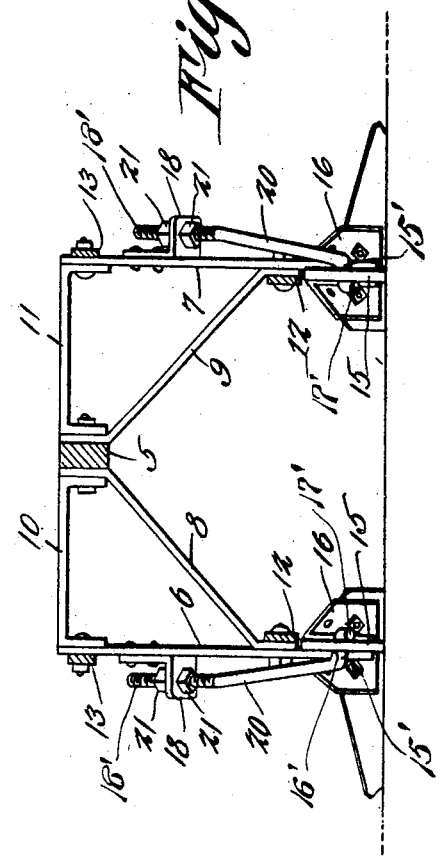
Witness
J. R. Tomlin
Inventor,
C. Bevill
By C. A. Snow & Co.
Attorneys.

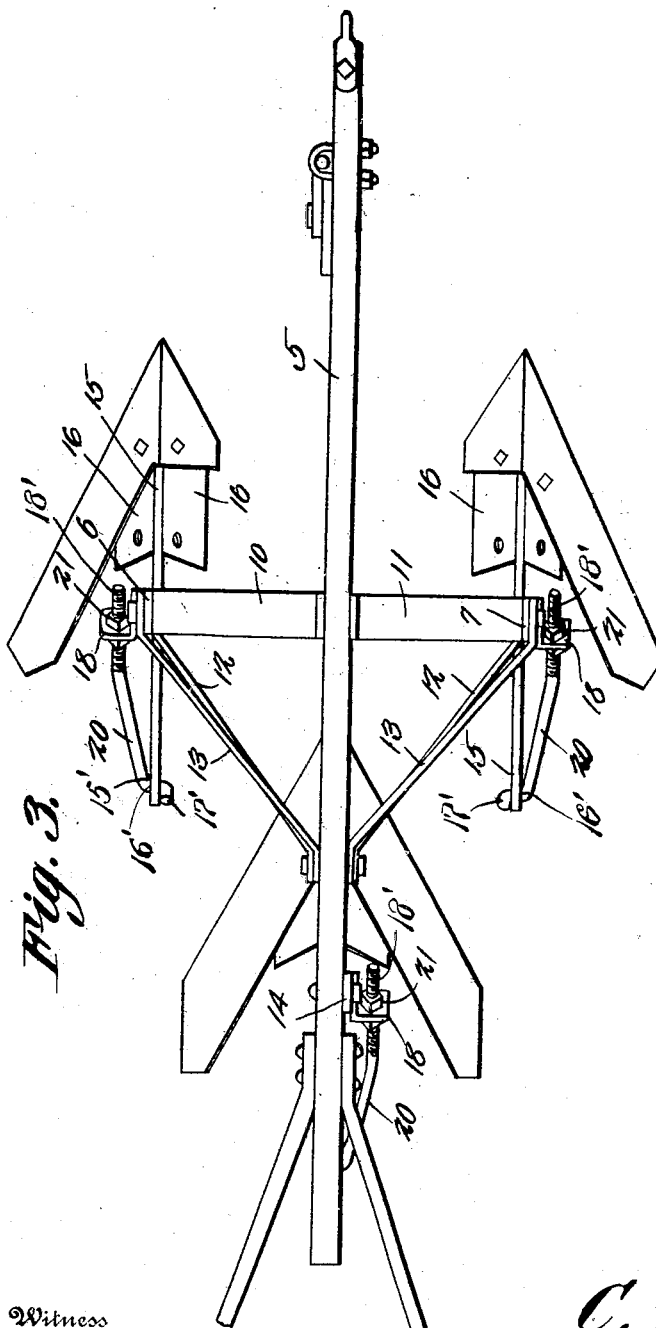

UNITED STATES PATENT OFFICE.

CLAIBOURN BEVILL, OF BUSHNELL, FLORIDA.

CULTIVATOR.

1,381,393.  Specification of Letters Patent.  Patented June 14, 1921.

Application filed May 17, 1919. Serial No. 297,919.

*To all whom it may concern:*

Be it known that I, CLAIBOURN BEVILL, a citizen of the United States, residing at Bushnell, in the county of Sumter and State of Florida, have invented a new and useful Cultivator, of which the following is a specification.

My invention relates to cultivators or plows.

The principal object of the invention is to provide a cultivator which employs a plurality of earth working elements that are arranged so that they may be interchanged and the device used either as a cultivator or as a plow.

A second object of the invention is to provide a plow or cultivator that is provided with earth working elements that may be adjusted to plow the ground at any desired depth.

Another object of the invention is to provide an earth working implement which is equipped with a plurality of earth cutting blades that are arranged so that the earth will be finely pulverized.

Still another object of the invention is to provide an implement of the above character which may be used as a straddle row cultivator.

An additional object of the invention resides in the provision of a cultivator or plow that is simple in construction, consists of few parts which may be readily interchanged, and which may be manufactured and sold at a minimum cost.

The above and other objects and advantages of the invention will be fully apparent from the following specification and accompanying drawing.

The invention consists of combinations of parts, constructions, arrangements and general assembly which will be hereinafter specifically referred to and illustrated in the accompanying drawing wherein:

Figure 1 is a side elevation of a plow constructed in accordance with my invention;

Fig. 2 is a vertical transverse sectional view of the same;

Fig. 3 is a top plan view of the plow.

In the drawing wherein like characters of reference indicate like parts the numeral 5 designates the plow beam to which the draft animals are hitched in the usual manner.

Vertical plow standards 6 and 7 are disposed upon either side of the plow beam. Secured to the beam and diverging downwardly therefrom are braces 8 and 9, the brace 8 being connected with the standard 6 while the brace 9 is connected with the standard 7.

Braces 10 and 11 extend laterally from the beam and connect with the upper end of the standards. A pair of brace bars 12 diverge from the beam 5 and connect with the standards 6 and 7 at their lower ends. A second pair of like bars 13 extend from the beam and connect with the standards at their upper ends.

A plow standard 14 depends from the beam 5 rearwardly of the standards 6 and 7 and is disposed so that the plow when carried thereby travels over that part of the ground between the standards 6 and 7.

A foot 15 is pivoted to each of the standards. These feet 15 are tapered at their forward ends and have angularly extending wings 16 secured to their opposite faces. Interchangeable plow shares are bolted to these wings.

Carried by each of the standards 6, 7 and 14 are outstanding locking plates 18 which are obliquely disposed and are provided with openings 19. As shown, each foot 15, is provided with an opening 16', formed at the rear thereof, which opening receives the right angled portion 15', of the rod 20, associated therewith, the rod 20, being also provided with an offset extremity 17', coöperating with one of the side faces of the foot 15, in order that one end of the rod 20, may be pivotally, but securely held to the foot 15. The upper extremity of each of the rods 20, is threaded as at 18', which threaded extremity is constructed to pass through an opening 19, formed in the outstanding locking plate 18, to which the same is secured, the nuts 21, being moved to closely engage the plates 18, for securing the rods 20, in various positions of adjustment.

This embodiment of the invention is considered to be the preferred construction but it is to be understood that the invention may be modified in many different respects and that my limits of modification are only governed by the subjoined claim.

What is claimed is:

In a cultivator, a plow beam, standards depending from the plow beam, a plow pivotally supported on the lower end of each of the standards, a foot forming a part of each plow and having an opening therein, an adjusting rod associated with each plow, each adjusting rod having a right angled end passing through the opening of the foot associated therewith, each right angled end having an offset portion to lock the rods within the openings, and means for adjusting one end of the rod to cause a relative movement of the plow.

In testimony that I claim the foregoing as my own, I have hereto affixed my signature in the presence of two witnesses.

CLAIBOURN BEVILL.

Witnesses:
KENNETH H. CASSADY,
A. J. BURNHAM.